US012573798B2

(12) United States Patent
Menachem et al.

(10) Patent No.: US 12,573,798 B2
(45) Date of Patent: Mar. 10, 2026

(54) DYNAMIC LANE REALLOCATION BASED ON BANDWIDTH NEEDS

(71) Applicant: QUALCOMM Incorporated, San Diego, CA (US)

(72) Inventors: Adi Menachem, Hod Hasharon (IL); Lalan Jee Mishra, Escondido, CA (US); Amit Gil, Zichron Yaakov (IL)

(73) Assignee: Qualcomm Incorporated, San Diego, CA (US)

( * ) Notice: Subject to any disclaimer, the term of this patent is extended or adjusted under 35 U.S.C. 154(b) by 565 days.

(21) Appl. No.: 18/050,852

(22) Filed: Oct. 28, 2022

(65) Prior Publication Data

US 2024/0146005 A1 May 2, 2024

(51) Int. Cl.
*H01R 24/20* (2011.01)
*H01R 24/60* (2011.01)
*H01R 107/00* (2006.01)

(52) U.S. Cl.
CPC ............. *H01R 24/20* (2013.01); *H01R 24/60* (2013.01); *H01R 2107/00* (2013.01)

(58) Field of Classification Search
CPC ............ H04R 2420/05; H04R 2420/01; H04R 2420/09; H04R 5/04; G06F 13/387; G06F 13/4282; G06F 13/102; G06F 13/4081; G06F 13/4068; H01R 24/20; H01R 24/60; H01R 107/00; H01R 13/66; H01R 13/6658; H01R 13/6461
See application file for complete search history.

(56) References Cited

U.S. PATENT DOCUMENTS

2017/0017595 A1* 1/2017 Schnell ............... G06F 13/4286
2018/0027330 A1* 1/2018 Rand ..................... G06F 13/387 381/309

* cited by examiner

*Primary Examiner* — Ernest Unelus
(74) *Attorney, Agent, or Firm* — Withrow & Terranova, PLLC

(57) ABSTRACT

Systems and methods for dynamic lane reallocation based on bandwidth needs are disclosed. In one aspect, dynamic repurposing of low-speed lanes for creation of a high-speed lane on a communication bus is disclosed. The repurposed low-speed lanes may be used to support a symmetrical high-speed link or an asymmetrical high-speed link. Further changes are provided to shield conductors in a cable to assist in preventing crosstalk or unwanted electromagnetic emissions. The addition of such a dynamic high-speed lane may assist in data transfer for data intensive use cases.

8 Claims, 13 Drawing Sheets

DYNAMIC LANE REALLOCATION BASED ON BANDWIDTH NEEDS

BACKGROUND

I. Field of the Disclosure

The technology of the disclosure relates generally to using lanes in a communication bus based on bandwidth needs.

II. Background

Computing devices abound in modern society. Increased processing capabilities in such devices means that the devices have evolved into sophisticated computing and entertainment centers, thus enabling enhanced user experiences. With the advent of the myriad functions available to such devices, there has been increased pressure to find ways to move data from one integrated circuit to another or from one device to another. The Universal Serial Bus (USB) standard promulgated by the USB Implementers Forum (USB-IF) is one popular standard used by many market participants. The first USB standard was published in 1996. Since that time, USB 2.0, USB 3.0, and most recently, USB 4.0 have all been released. Since the August 2019 release of USB 4.0, a second version (v. 2.0) has been proposed and released as of Oct. 25, 2022. The evolution of the USB standard provides opportunities for innovation.

SUMMARY

Aspects disclosed in the detailed description include dynamic lane reallocation based on bandwidth needs. In particular, exemplary aspects of the present disclosure allow for dynamic repurposing of low-speed lanes for creation of a high-speed lane on a communication bus. The repurposed low-speed lanes may be used to support a symmetrical high-speed link or an asymmetrical high-speed link. Further changes are provided to shield conductors in a cable to assist in preventing crosstalk or unwanted electromagnetic emissions. The addition of such a dynamic high-speed lane may assist in data transfer for data intensive use cases.

In this regard in one aspect, a cable is disclosed. The cable includes a first plug. The first plug includes twenty-two pins complying with a USB Type-C pin layout, a twenty-third pin corresponding to a B6 position, and a twenty-fourth pin corresponding to a B7 position. The cable also includes a second plug. The cable also includes a first conductor coupled to the twenty-third pin of the first plug. The cable also includes a second conductor coupled to the twenty-fourth pin of the first plug.

In another aspect, an endpoint is disclosed. The endpoint includes a receptacle configured to be connected to a plug on a cable, the receptacle complying with a USB Type-C pin layout. The endpoint also includes a physical interface (PHY). The PHY includes a control circuit. The control circuit is configured to send a first signal through an A6 pin and an A7 pin in the receptacle. The control circuit is also configured to concurrently send a second signal through a B6 pin and a B7 pin in the receptacle.

In another aspect, a method of dynamically reallocating lanes in a communication bus is disclosed. The method includes determining a need for a bandwidth. The method also includes assigning a USB 2.0 channel to handle a forty gigabits per second (40 Gbps) signal.

DETAILED DESCRIPTION

Figure 1A:
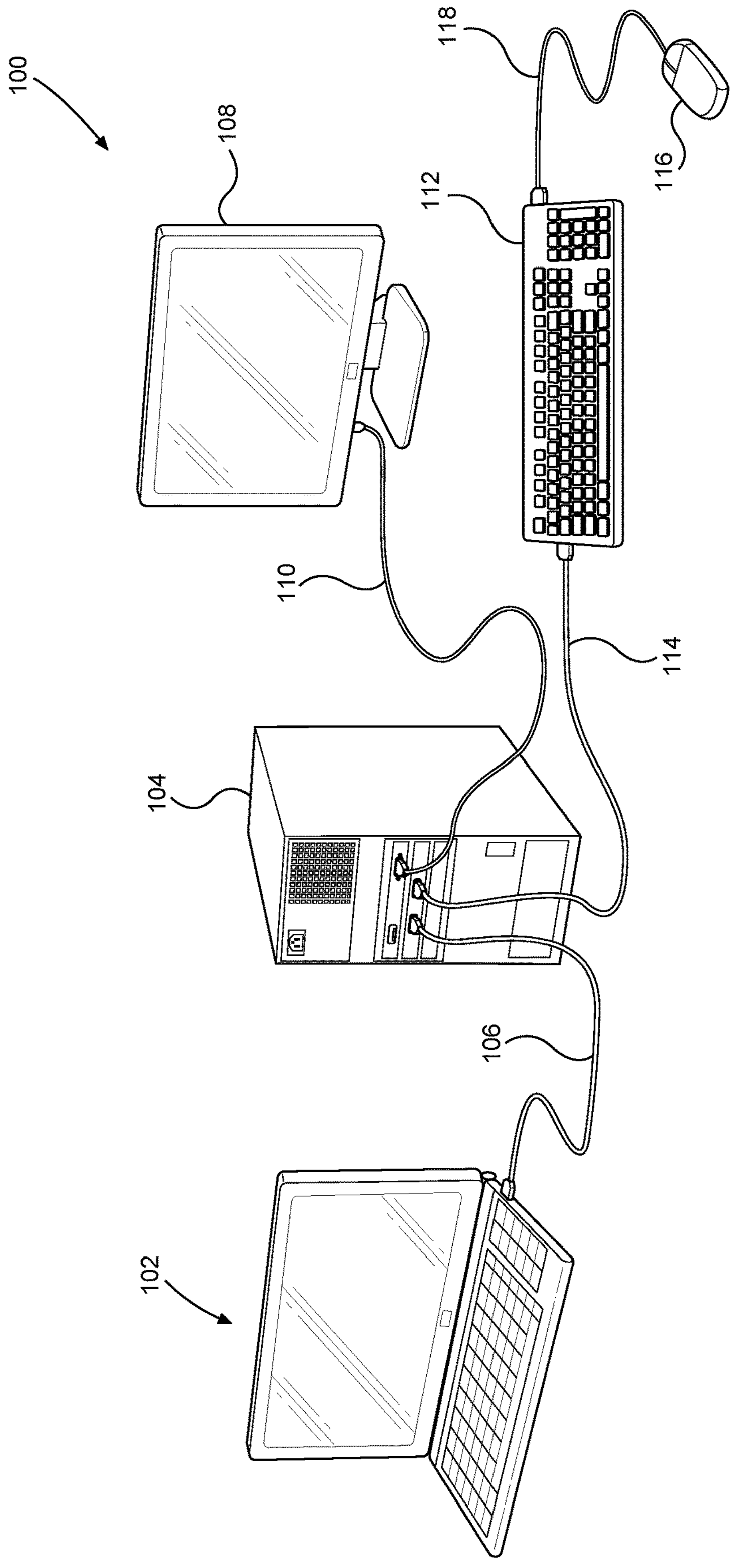
FIG. 1A is a stylized representation of a computing system with multiple cable-based communication buses connecting devices within the system.
Figure 1B:
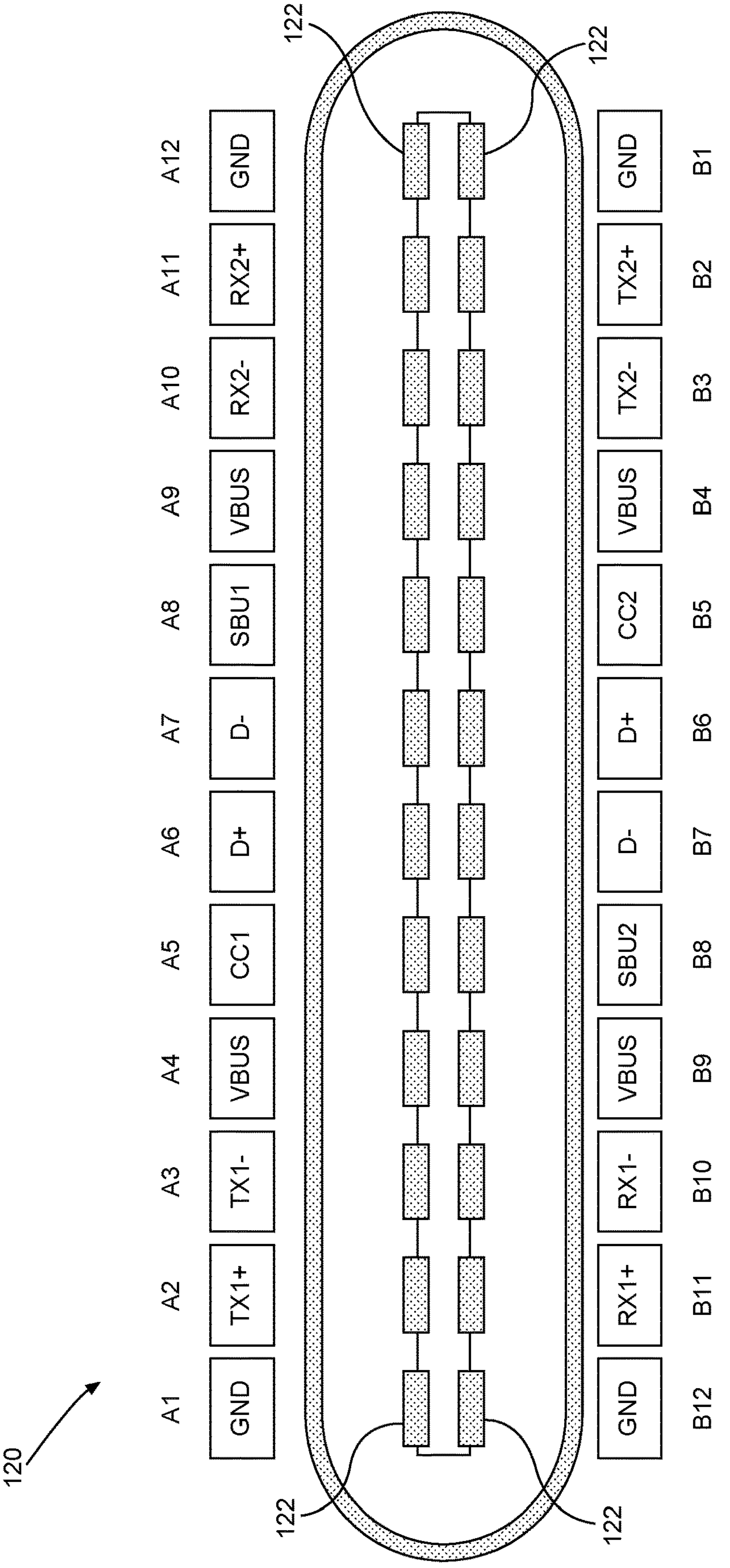
FIG. 1B is a diagram of a pin layout for a receptacle, and particularly for a Universal Serial Bus (USB) Type-C receptacle such as may be present on the devices within the computing system of FIG. 1A.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include dynamic lane reallocation based on bandwidth needs. In particular, exemplary aspects of the present disclosure allow for dynamic repurposing of low-speed lanes for creation of a high-speed lane on a communication bus. The repurposed low-speed lanes may be used to support a symmetrical high-speed link or an asymmetrical high-speed link. Further changes are provided to shield conductors in a cable to assist in preventing crosstalk or unwanted electromagnetic emissions. The addition of such a dynamic high-speed lane may assist in data transfer for data intensive use cases.

Exemplary aspects of the present disclosure are well suited for use with a communication bus based on the Universal Serial Bus (USB) 4.0, version 2.0. Accordingly, the examples provided throughout the present disclosure are based thereon. However, it should be appreciated that other communication buses may benefit from the teachings set forth herein and the concepts are not limited to the USB environment. Likewise, future generations of USB may also benefit from the teachings presented herein.

To assist in understanding how to dynamically reallocate lanes based on bandwidth needs, a discussion of a USB 4.0 system is provided with reference to FIGS. 1A-1E. Details about the changes effected thereon are discussed below beginning with reference to FIG. 2A.

In this regard, FIG. 1A illustrates a computing system 100 where a laptop computer 102 is coupled to a desktop computer 104 through a USB cable 106. The desktop computer 104 is coupled to a monitor 108 through a USB cable 110. The desktop computer 104 is coupled to a keyboard 112 through a USB cable 114. The keyboard 112 is coupled to a mouse 116 through a USB cable 118. Note that other arrangements are possible (e.g., the mouse 116 may couple directly to the desktop computer 104 through the USB cable 118 without the intervening keyboard 112). Likewise, other devices may couple into the computing system 100 through cables, through a wireless connection, or the like.

The cables 106, 110, 114, and 118 may be integral to the device (e.g., the mouse end of the cable 118 may be integrated into the mouse 116) or have removable ends or plugs that plug into complementary receptacles as is well known. Aspects of the present disclosure apply to cables having two plugs or a plug and an integral end as well as USB buses that do not have a specific cable, but do have conductors operating according to a USB specification. It should be appreciated that the devices on either end of a cable may be referred to as endpoints. Likewise, in USB terminology, the host/master endpoint may be referred to as a downstream-facing port, and the slave/remote device endpoint may be referred to as an upstream-facing port.

One of the perceived complaints about early generations of USB was that plugs had a specific direction for insertion into receptacles. The advent of the Type-C receptacle and plug created a new form factor, and addressed this complaint by creating a mirrored pin layout as seen by the receptacle 120 of FIG. 1B. Each "side" of the pin layout has twelve pins 122, each with a designated function according to the following table.

TABLE 1

| PIN | Name | Functional description | PIN | Name | Functional description |
|---|---|---|---|---|---|
| A1 | GND | Ground/Drain Wire | B12 | GND | Ground/Drain Wire |
| A2 | SSTXp1 | SuperSpeed differential signal #1, TX, positive | B11 | SSRXp1 | SuperSpeed differential signal #1, RX, positive |
| A3 | SSTXn1 | SuperSpeed differential signal #1, TX, negative | B10 | SSRXn1 | SuperSpeed differential signal #1, RX, negative |
| A4 | VBUS | Power supply | B9 | VBUS | Power supply |
| A5 | CC1 | Configuration channel | B8 | SBU2 | Sideband use (SBU) |
| A6 | Dp1 | USB 2.0 differential signal, position 1, positive | B7 | Dn2 | USB 2.0 differential signal, position 2, negative |
| A7 | Dn1 | USB 2.0 differential signal, position 1, negative | B6 | Dp2 | USB 2.0 differential signal, position 2, positive |

TABLE 1-continued

| PIN | Name | Functional description | PIN | Name | Functional description |
|---|---|---|---|---|---|
| A8 | SBU1 | Sideband use (SBU) | B5 | CC2 | Configuration channel |
| A9 | VBUS | Power supply | B4 | VBUS | Power supply |
| A10 | SSRXn2 | SuperSpeed differential signal #2, RX, negative | B3 | SSTXn2 | SuperSpeed differential signal #2, TX, negative |
| A11 | SSRXp2 | SuperSpeed differential signal #2, RX, positive | B2 | SSTXp2 | SuperSpeed differential signal #2, TX, positive |
| A12 | GND | Ground/Drain Wire | B1 | GND | Ground/Drain Wire |

Figure 1C:
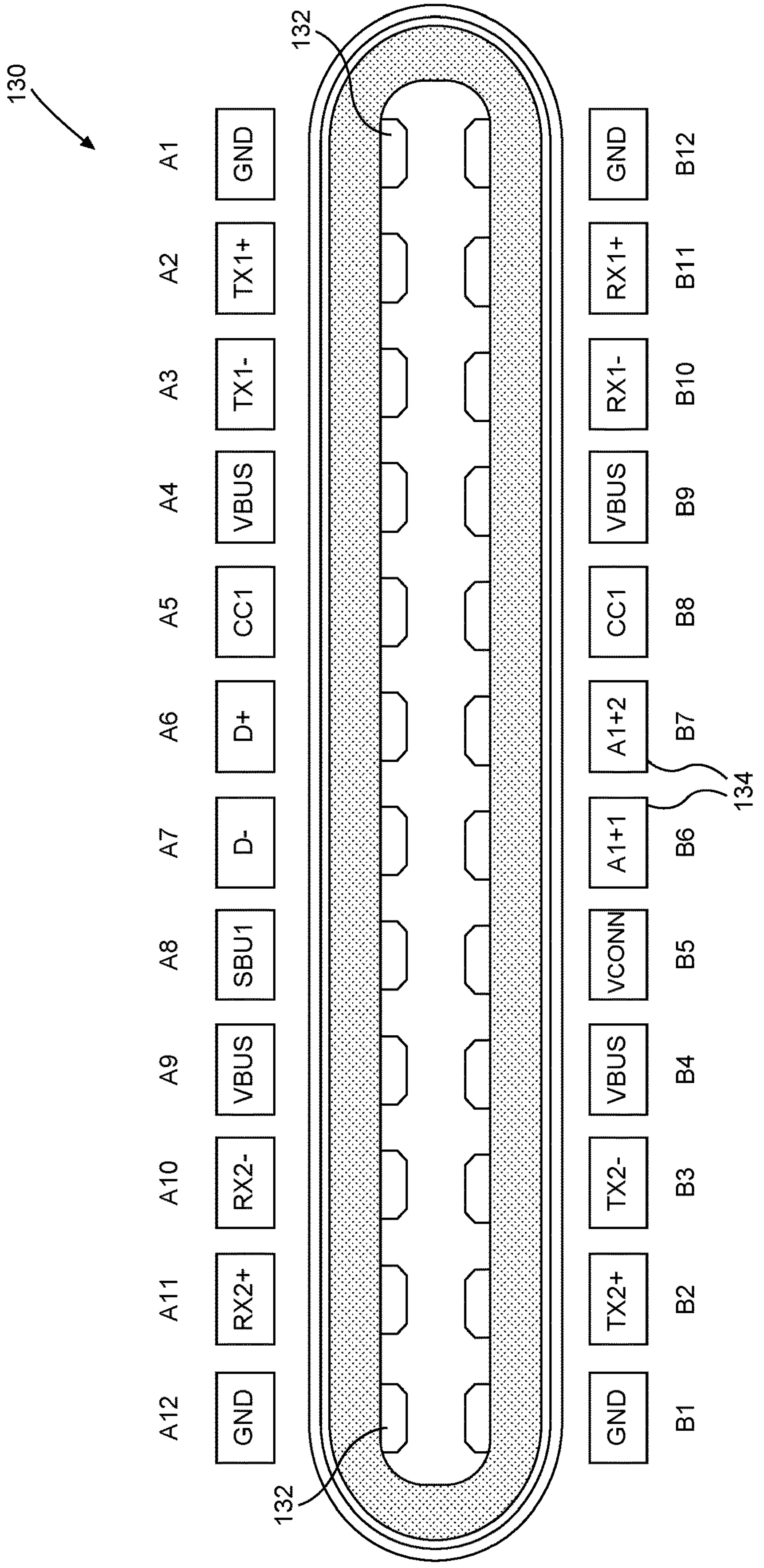
FIG. 1C is a diagram of a pin layout for a USB Type-C plug such as may be present on cables within the computing system of FIG. 1A.
Figure 1D:
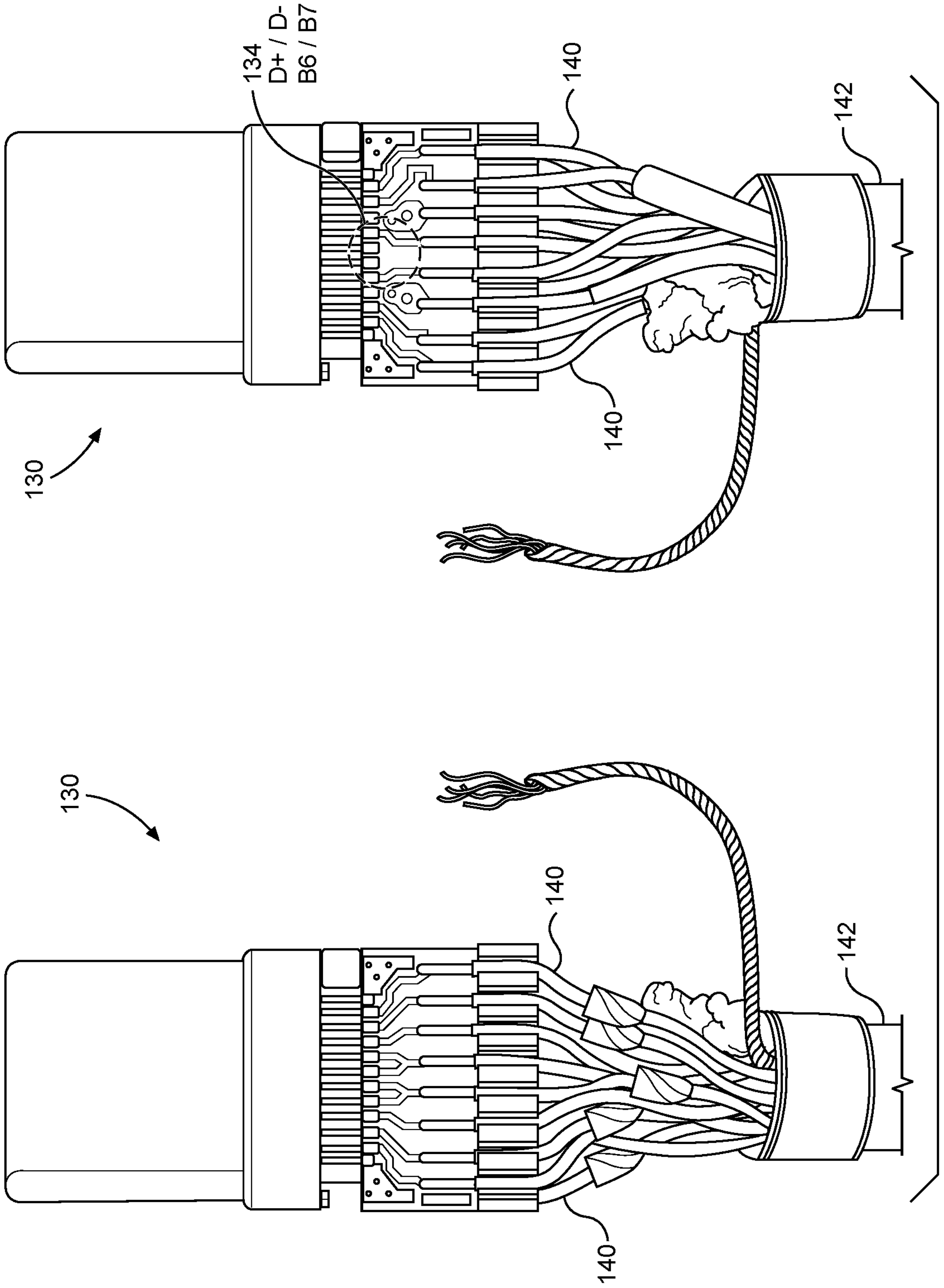
FIG. 1D has top and bottom plan views of conductors within a cable coupled to the plug of FIG. 1C highlighting how pins B6 and B7 are not coupled to conductors conventionally.

Conventional plugs 130, illustrated in FIG. 1C have a complementary pin layout, with pins 132 coupled to conductors 140 within the body of the cable 142 (FIG. 1D). Saliently, the B6 and B7 pins 134 corresponding to the D+/D− channel do not have conductors as illustrated better in FIG. 1D. When inserted "right side up," the A6 and A7 pins 132 of the plug 130 mate to the A6 and A7 pins of the receptacle 120. When inserted "right side down," the A6 and A7 pins 132 of the plug 130 mate to the B6 and B7 pins 122 of the receptacle 120. The receptacle 120 provides the same signal at pin 122 pair A6, B6 and pin 122 pair A7, B7 so that regardless of how the plug 130 is inserted, the D+/D− channel is provided to the A6 and A7 pins 132 of the plug 130.

Figure 1E:
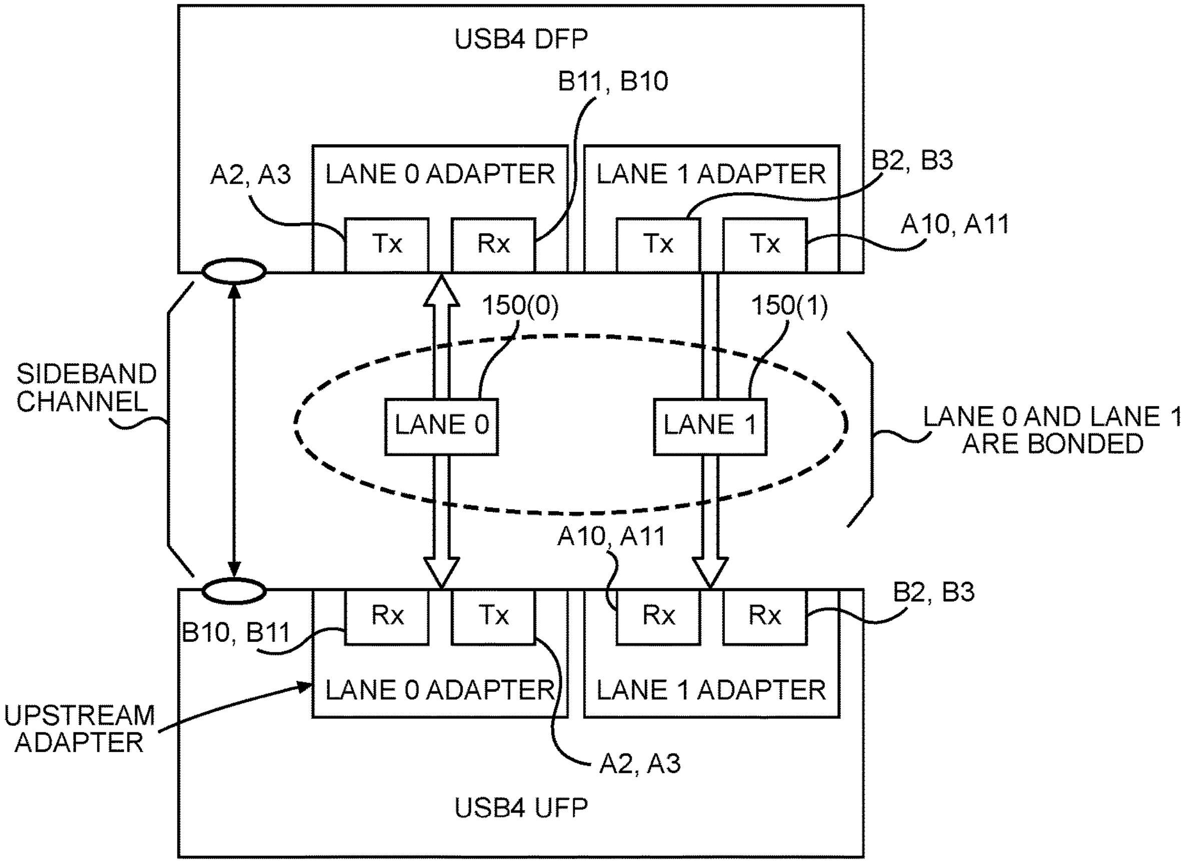
FIG. 1E is a block diagram showing existing high-speed lanes in a conventional USB system.

FIG. 1E provides a schematic diagram of high-speed lanes 150(0), 150(1) created using the superspeed differential channel on A2, A3, B11, B10 and A10, A11, B3, B2, respectively. USB 4 2.0 also operates at forty gigabits per second (40 Gbps) on each lane (TX1, RX1, TX2, RX2). More accurately, the bandwidth is very close to 40 Gbps and thus may be referred to as "approximately" 40 Gbps, where approximately means within five percent. The dual-lane link can be symmetric with 80 Gbps in each direction or asymmetric with 120 Gbps in one direction and 40 Gbps in the other direction.

There are use cases where more than 160 Gbps may be desired. For example, supporting two display port adaptor ports with 64 Gbps of a Peripheral Component Interconnect Express (PCIE) or the like may require more than 160 Gbps. Current USB 4 v.2 does not support such high bandwidth requirements. Again, these bandwidths are approximate.

Exemplary aspects of the present disclosure provide at least one and potentially two additional high-speed lanes by dynamically repurposing the "unused" D+/D− channel and pins. This dynamic repurposing requires some hardware modifications at the devices and additional conductors in the cable as well as some additional communication between the endpoints to verify that both endpoints support the improved bandwidth options. These modifications are set forth below.

Figure 2A:
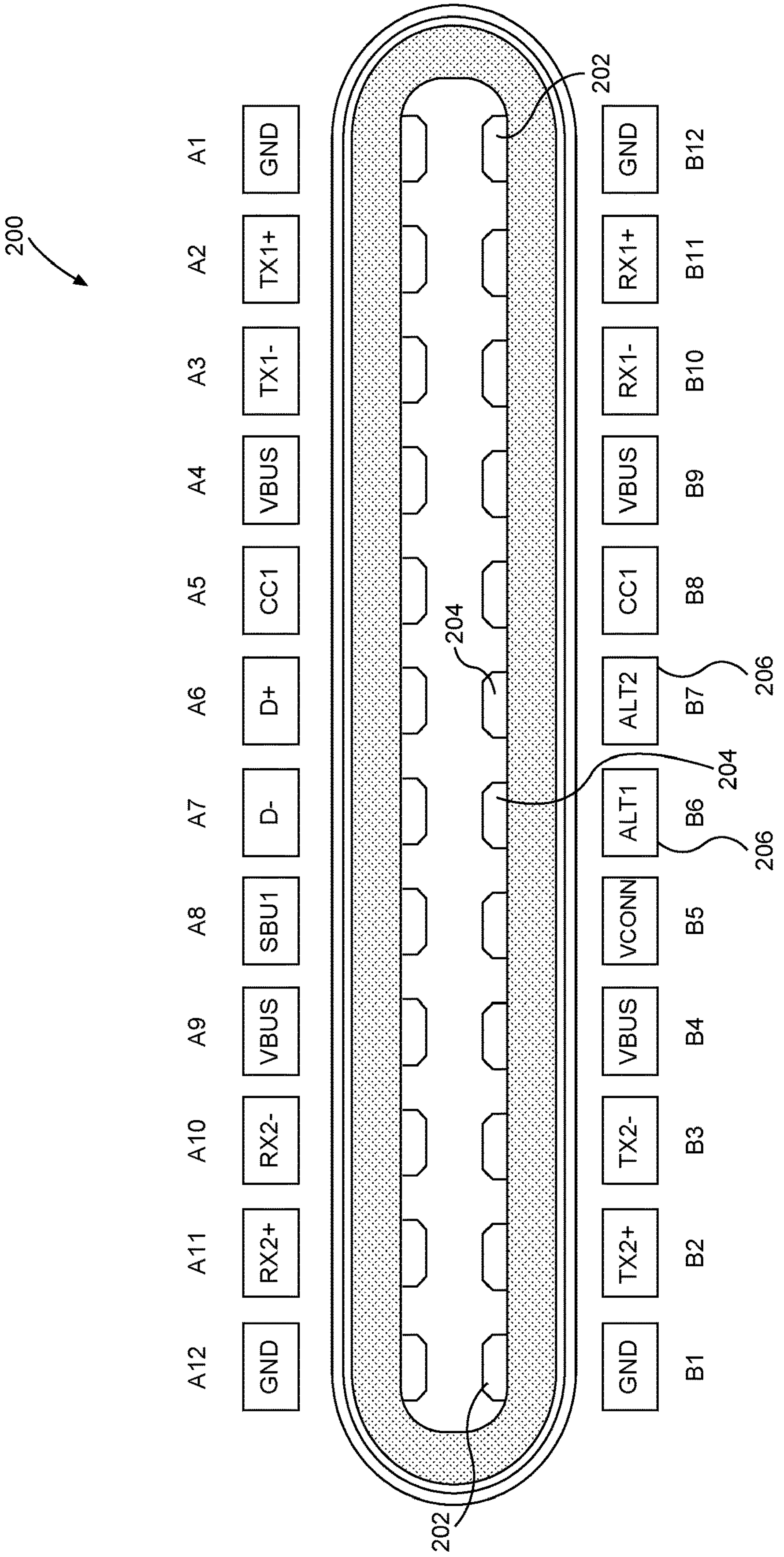
FIG. 2A is a diagram of a pin layout for a plug highlighting the reallocation of pins and lanes according to exemplary aspects of the present disclosure.
Figure 2B:
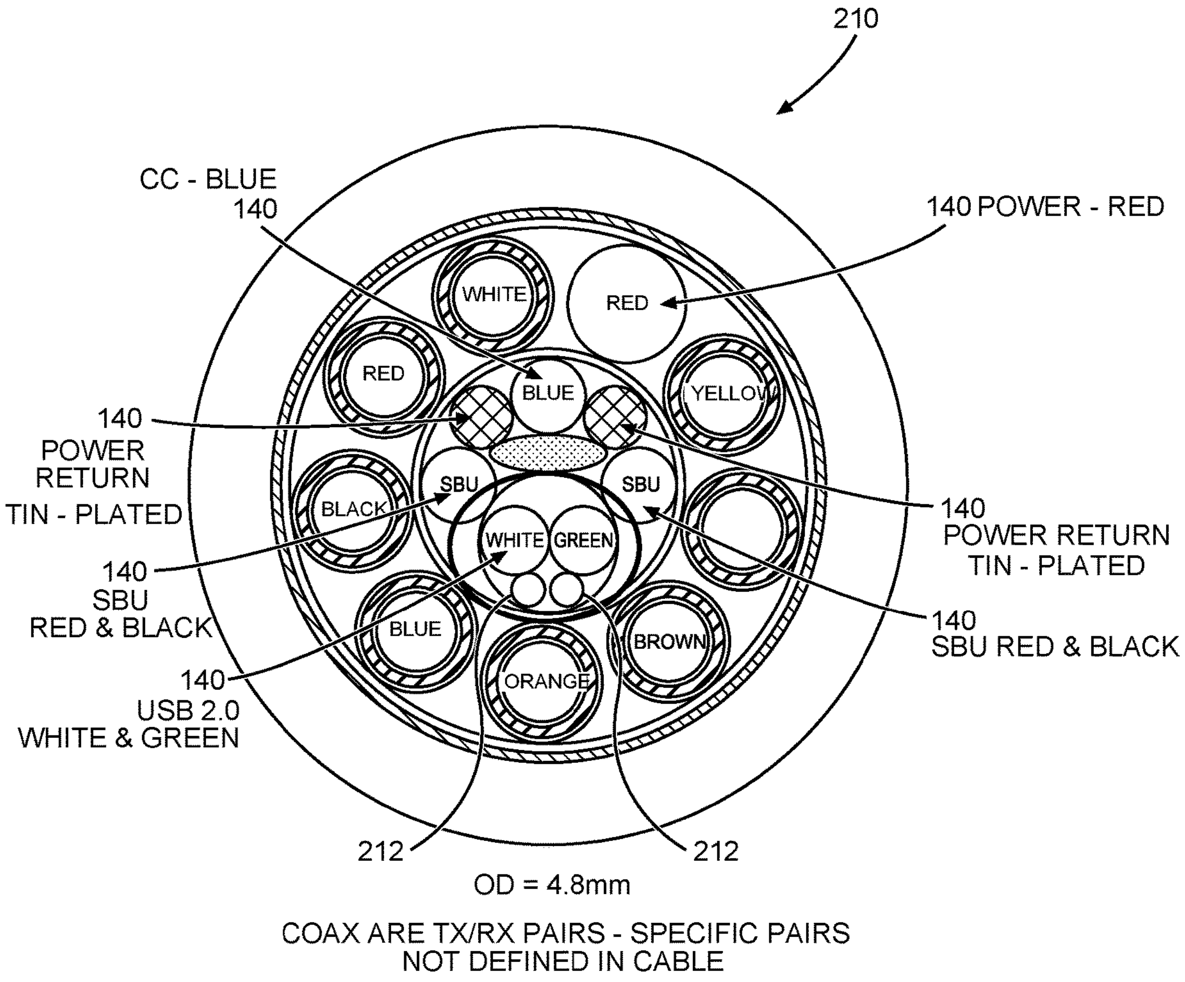
FIG. 2B is a cross-sectional view of a communication bus cable showing the additional conductors and shielding provided around lanes eligible for reallocation.

In this regard, as illustrated in FIG. 2A, a plug 200 has pins 202 which substantially conform to the USB Type-C standard, but also adds pins 204 which carry an alternate channel 206 which can support an additional 40 Gbps of unidirectional traffic. In contrast to the cable 142 of FIG. 1E, a cable 210, illustrated in FIG. 2B, has two additional conductors 212 to carry the additional signals. Shielding may be provided to assist in preventing crosstalk or unwanted electromagnetic emissions.

Figure 3A:
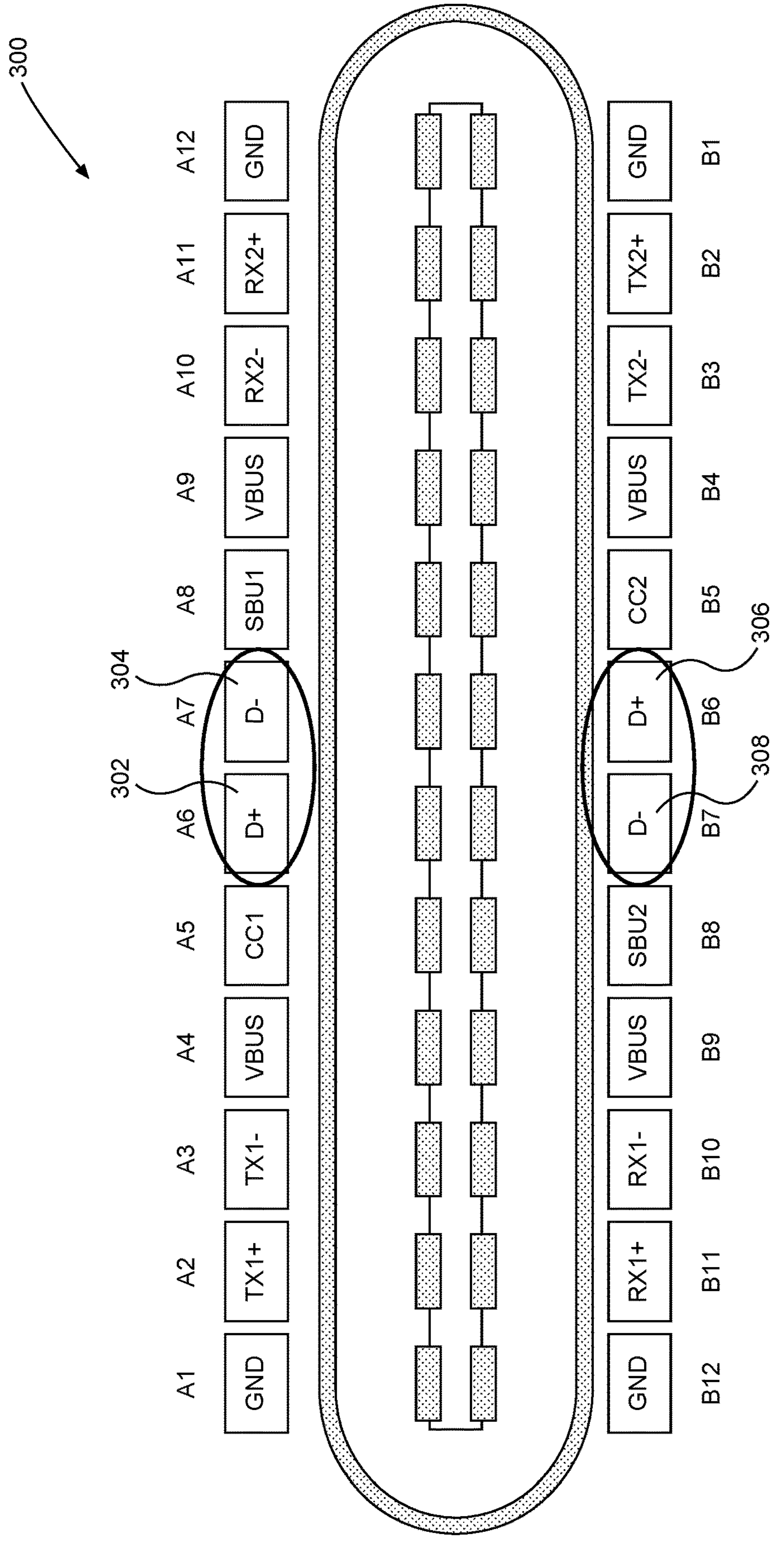
FIG. 3A is a first exemplary lane reallocation in the receptacle where four pins and lanes are reallocated.
Figure 3B:
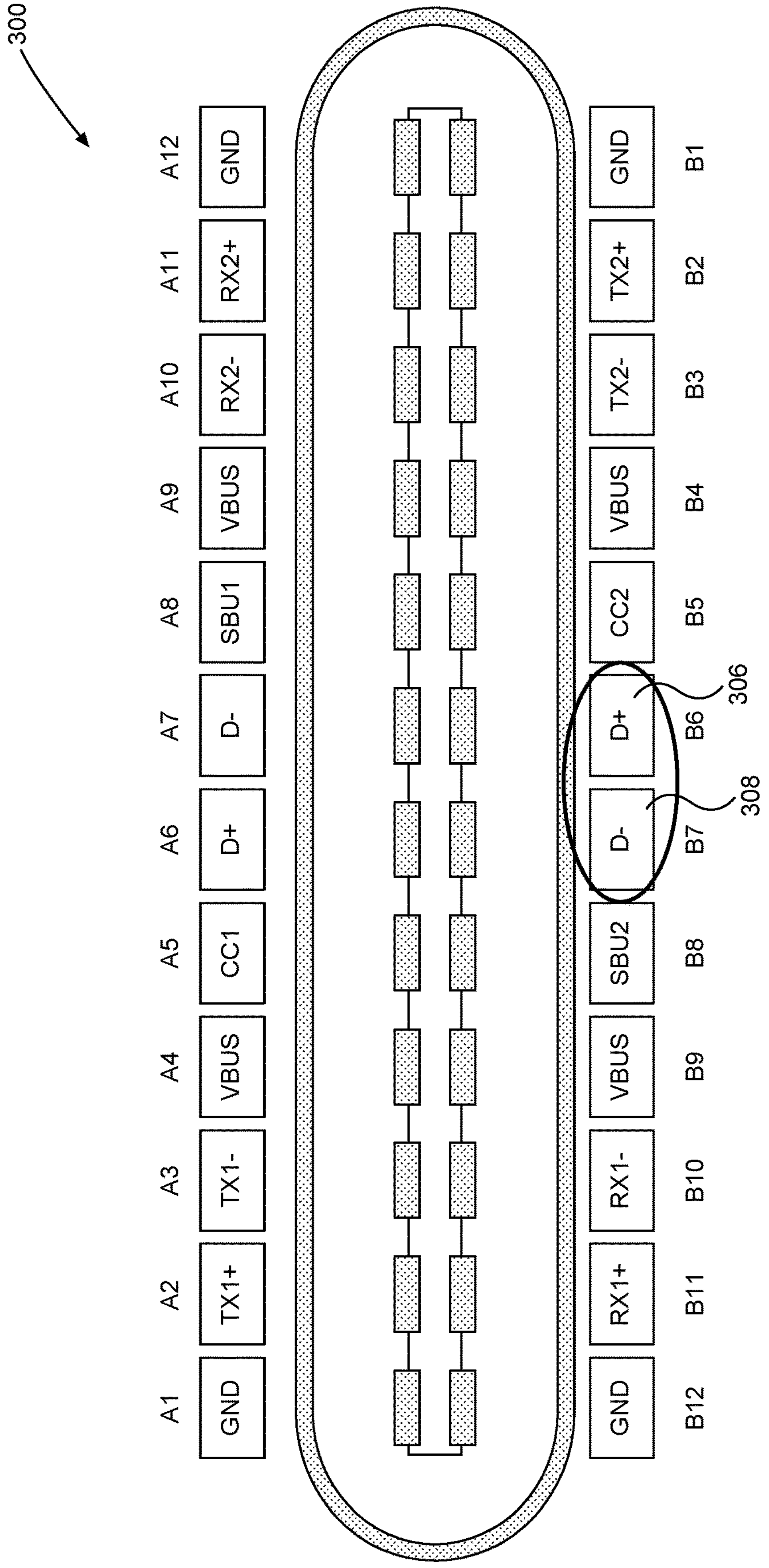
FIG. 3B is a second exemplary lane reallocation in the receptable where only two pins and lanes are reallocated after insertion direction detection.

In some aspects, the endpoints may not use any USB 2.0 channel thereby freeing up the original D+/D− lines. Thus, in receptacle 300 illustrated in FIG. 3A, pins 302, 304 corresponding to A6, A7 are used for a first extra channel while pins 306, 308 corresponding to B6, B7 are used for a second extra channel. If, however, the endpoints are using the USB 2.0 channel, only pins 306, 308 are used for the extra channel.

There may be multiple ways that endpoints may determine when and how to use the extra bandwidth afforded by aspects of the present disclosure. Two such processes are illustrated in FIGS. 4A and 4B with subvariations explained therewithin.

Figure 4A:
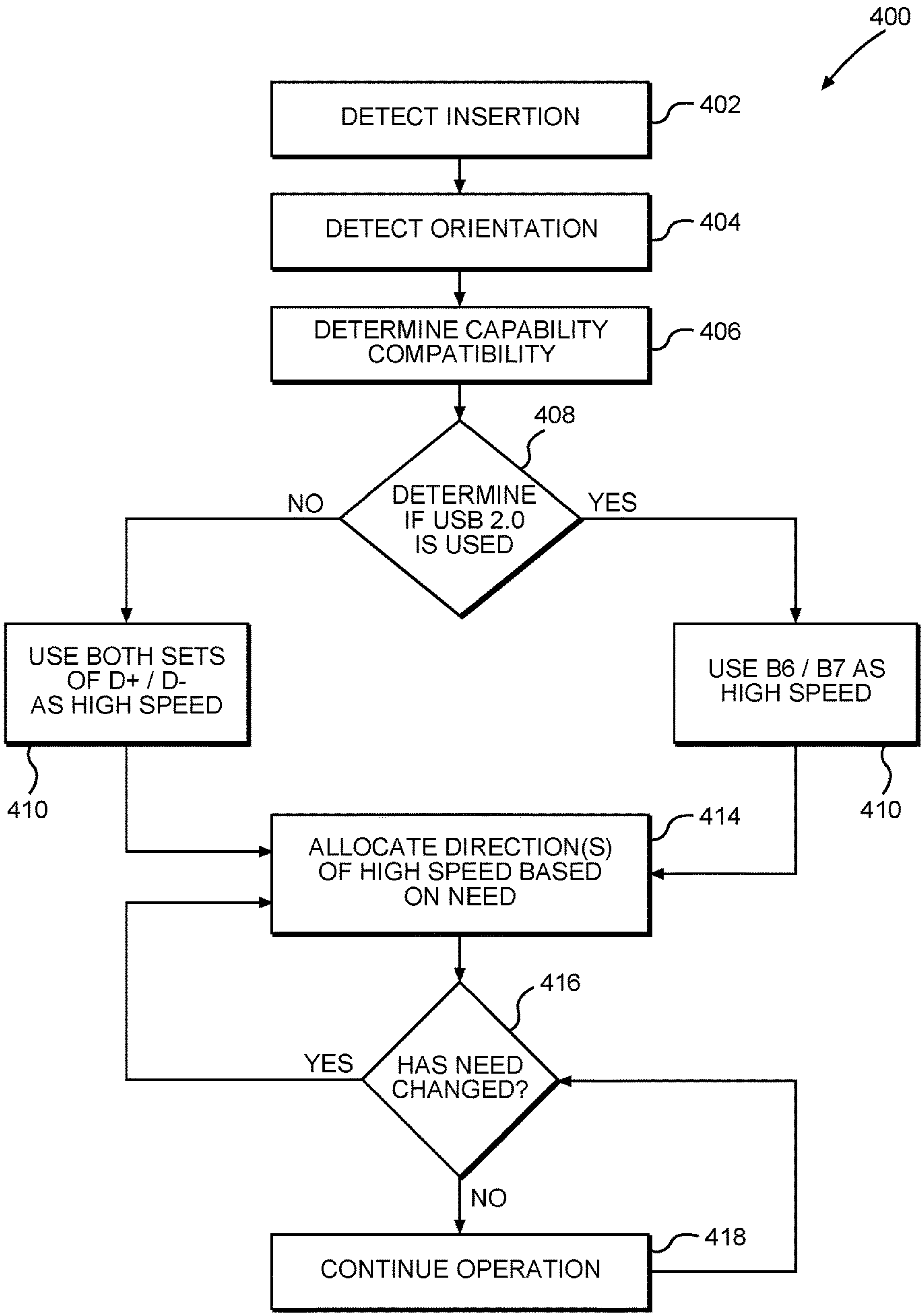
FIG. 4A is a flowchart illustrating a process for dynamic lane reallocation according to exemplary aspects of the present disclosure based on insertion detection.
Figure 4B:
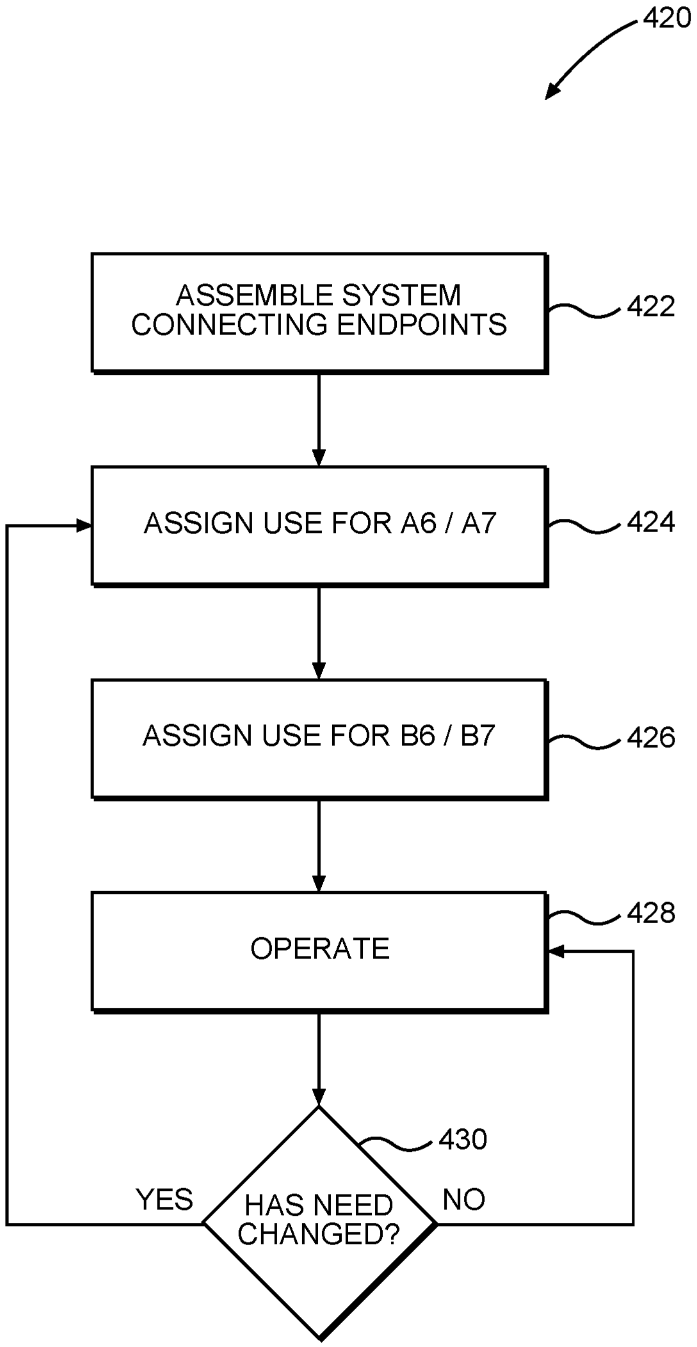
FIG. 4B is a flowchart illustrating a process for dynamic lane reallocation according to exemplary aspects of the present disclosure for a dedicated (i.e., non-removable) communication bus.

In this regard, FIG. 4A illustrates a first process 400 where the endpoints have no a priori knowledge of each other. The process 400 may initially follow the insertion and orientation detection processes of the USB Type-C specification. The process 400 begins when an endpoint detects insertion (block 402) of a plug 200 into a receptacle 300 (e.g., through source-to-sink attach/detect detection). The endpoint then detects an orientation (block 404) of the plug 200 relative to the receptacle 300 (i.e., is the plug 200 "right side up" or "right side down" relative to the receptacle 300). As set forth in the USB Type-C specification, the "USB Type-C plug can be inserted in either one of two orientations, therefore the CC pins enable a method for detecting plug orientation in order to determine the lane ordering of the SuperSpeed USB data signal pairs functionally connected through the cable and identify the Configuration Lane for dual-lane operation when supported."

The downstream-facing port (i.e., the host or master) may then determine capability compatibility (block 406). This determination may be done in a variety of ways such as sending signals on the sideband channel, sending signals on the command and control (CC) channel, sending signals on the USB 2.0 channel, or the like. The signals may read from a register at the upstream-facing port (i.e., the slave or remote device) or the like.

The upstream-facing port may then determine if the USB 2.0 channel is used (block 408). While USB 4 assumes that the USB 2.0 channel will be used, not all use cases require such use. Thus, if the answer to block 408 is yes, the USB 2.0 channel is used, then pins B6 and B7 are used as a high-speed channel (block 410). However, if the answer to block 408 is no, the USB 2.0 channel is not used, then both sets of D+/D− pins may be used for high-speed channels (block 412).

The downstream-facing port may then allocate direction(s) for the high-speed channels based on need (block 414). For example, there could be 40 Gbps added in each direction raising the default value of 80 Gbps bidirectional to 120 Gbps bidirectional. Alternatively, it could be 160 Gbps in one direction and 80 Gbps in the other. Likewise, if only one additional high-speed channel is available, the split may be 120 Gbps in one direction and 80 Gbps in the other direction or 160 Gbps in one direction and 40 Gbps in the other. Other ratios may be used. In addition to setting the number of lanes, there may be a sequence (not illustrated) for enabling and synchronizing the lanes so that they can operate as part of the same link and data is synchronously distributed amongst them. A process for transitioning from symmetric to asymmetric lanes and the addition/removal of lanes is defined in the USB 4 2.0 specification and may be adjusted as appropriate for the additional dynamic lanes created by aspects of the present disclosure.

The downstream-facing port may also monitor to see if the need has changed (block 416). If yes, then the ratio may be reallocated at block 414. Otherwise, operation continues (block 418).

Another possibility, illustrated by process 420 in FIG. 4B is available if there are hardwired (i.e., no removable plugs and connectors) connections between endpoints (e.g., a keyboard coupled to a mouse, virtual reality (VR) goggles coupled to a VR glove, or two integrated circuits within a single system connected by a USB bus). The process 420 begins by assembling the system and connecting the endpoints (block 422). During assembly, the designers may assign a use for the A6/A7 pins corresponding to the USB 2.0 channel (block 424) either as a USB 2.0 channel or a high-speed channel. The designers may also assign a use for the B6/B7 pins (block 426) as a high-speed channel. The system then operates (block 428). A downstream-facing port may monitor to see if the needs of the system have changed (block 430) with reallocation if the answer is yes.

Figure 5:
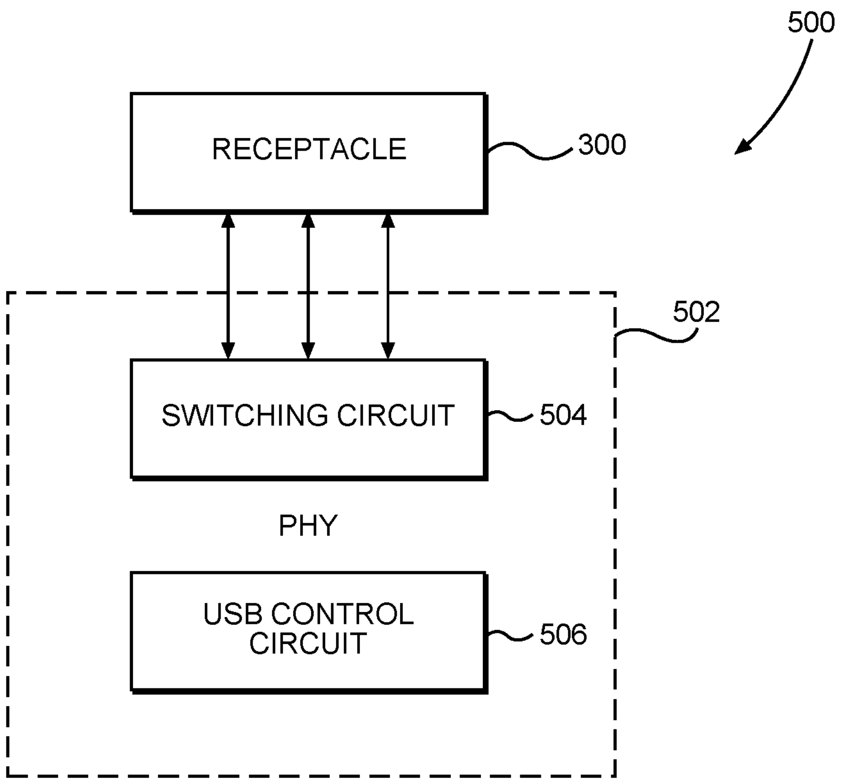
FIG. 5 is a block diagram showing the hardware used for routing data to the reallocated lanes according to an exemplary aspect of the present disclosure.

In addition to the extra conductors in the cable to carry the additional channel, some changes may be made at the endpoints as better seen in FIG. 5. Specifically, an endpoint 500 (which may be a downward-facing port or an upward-facing port) may include a receptacle 300 that couples to a physical layer (PHY) 502. The PHY 502 may include a switching circuit 504 and a control circuit 506. Based on instructions from the control circuit 506, the switching circuit 504 may route signals to appropriate pins so that the high-speed signals are conveyed across the appropriate channels.

The communication buses with the ability to support dynamic lane and pin reallocation according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
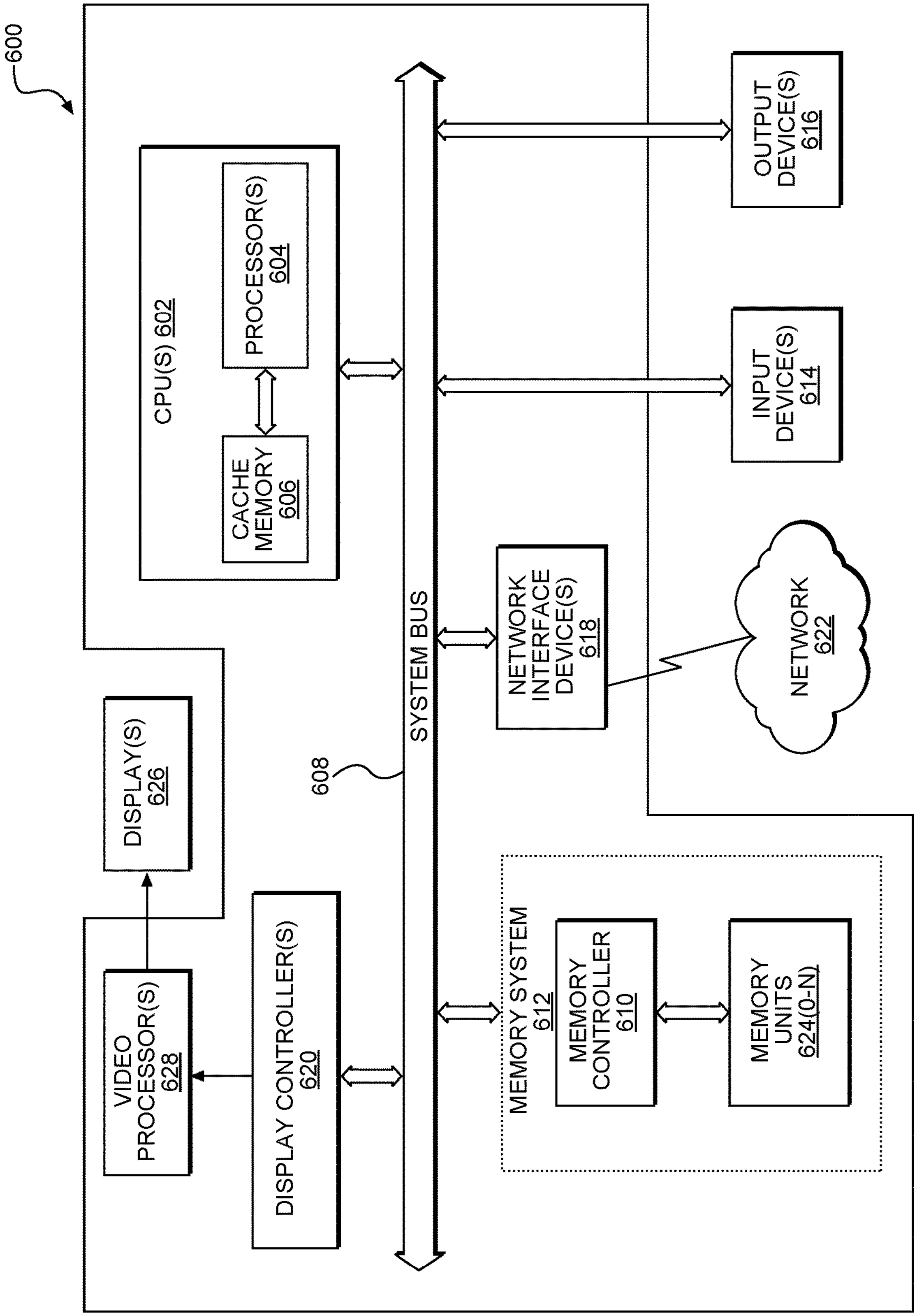
FIG. 6 is a block diagram of an exemplary processor-based system that can use the communication bus of the present disclosure.

In this regard, FIG. 6 illustrates an example of a processor-based system 600 that can employ the dynamic reallocation of channels across communication buses illustrated in FIG. 2A-5. In this example, the processor-based system 600 includes one or more central processing units (CPUs) 602, each including one or more processors 604. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device. Although not illustrated in FIG. 6, multiple system buses 608 could be provided.

Other devices can be connected to the system bus 608. As illustrated in FIG. 6, these devices can include a memory system 612, one or more input devices 614, one or more output devices 616, one or more network interface devices 618, and one or more display controllers 620, as examples. Communication buses according to the present disclosure may couple the CPU(s) 602 to one or more of these devices 612, 614, 616, 618. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 that controls one or more memory units 624(0-N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A cable comprising:

a first plug comprising:

twenty-two pins complying with a USB Type-C pin layout;

a twenty-third pin corresponding to a B6 position; and a twenty-fourth pin corresponding to a B7 position;

a second plug;

a first conductor coupled to the twenty-third pin of the first plug; and a second conductor coupled to the twenty-fourth pin of the first plug.

2. The cable of clause 1, wherein the first conductor is further coupled to the second plug.

3. The cable of clause 2, wherein the second conductor is further coupled to the second plug.

4. The cable of clause 3, wherein:

the first conductor is coupled to the second plug at a second B7 position; and the second conductor is coupled to the second plug at a second B6 position.

5. The cable of any preceding clause, further comprising shielding surrounding the first conductor and the second conductor.

6. The cable of any preceding clause, wherein the first plug further comprises pins at A1-A12 positions.

7. The cable of clause 6, wherein the first plug further comprises pins at B1-B5 and B8-B12 positions.

8. An endpoint comprising:

a receptacle configured to be connected to a plug on a cable, the receptacle complying with a USB Type-C pin layout; and a physical interface (PHY) comprising:

a control circuit configured to:

send a first signal through an A6 pin and an A7 pin in the receptacle; and concurrently send a second signal through a B6 pin and a B7 pin in the receptacle.

9. The endpoint of clause 8, further comprising a switching circuit coupled to the control circuit.

10. The endpoint of clause 8 or 9, wherein the endpoint comprises a downstream-facing port.

11. The endpoint of clause 8 or 9, wherein the endpoint comprises an upstream-facing port.

12. The endpoint of any of clauses 8 to 11, wherein the second signal comprises a second signal that is approximately forty gigabits per second (40 Gbps).

13. The endpoint of clause 12, wherein the first signal comprises a first signal that is approximately 40 Gbps.

14. The endpoint of any of clauses 8 to 13, wherein the control circuit is further configured to discover when a remote endpoint has dynamic lane reallocation capability.

15. A method of dynamically reallocating lanes in a communication bus, comprising:

determining a need for a bandwidth; and assigning a USB 2.0 channel to handle a signal that is approximately forty gigabits per second (40 Gbps).

16. The method of clause 15, further comprising determining a plug insertion.

17. The method of clause 15 or 16, further comprising determining a plug orientation.

18. The method of any of clauses 15 to 17, further comprising assigning a second USB 2.0 channel to handle a second signal that is approximately 40 Gbps.

What is claimed is:

1. An endpoint comprising:

a receptacle configured to be connected to a plug on a cable, the receptacle complying with a USB Type-C pin layout; and a physical interface (PHY) comprising:

a control circuit configured to:

send a first signal that is approximately forty gigabits per second (40 Gbps) through an A6 pin and an A7 pin in the receptacle; and concurrently send a second signal that is approximately 40 Gbps through a B6 pin and a B7 pin in the receptacle.

2. The endpoint of claim 1, further comprising a switching circuit coupled to the control circuit.

3. The endpoint of claim 1, wherein the endpoint comprises a downstream-facing port.

4. The endpoint of claim 1, wherein the endpoint comprises an upstream-facing port.

5. The endpoint of claim 1, wherein the control circuit is further configured to discover when a remote endpoint has dynamic lane reallocation capability.

6. A method of dynamically reallocating lanes in a communication bus, comprising:

determining a need for a bandwidth of the communication bus;

configuring a first USB 2.0 channel to send a first signal that is approximately forty gigabits per second (40 Gbps) on an A6 pin and an A7 pin in a receptacle connected to the communication bus; and configuring a second USB 2.0 channel to send, concurrent with the first signal, a second signal that is approximately 40 Gbps on a B6 pin and a B7 pin in the receptacle.

7. The method of claim 6, further comprising determining a plug insertion.

8. The method of claim 6, further comprising determining a plug orientation.

* * * * *